United States Patent [19]
Sanderson

[11] Patent Number: 5,517,895
[45] Date of Patent: May 21, 1996

[54] APPARATUS AND METHODS FOR MOUNTING A WEAPONRY SUPPORT PLANK ON THE CABIN AREA FLOOR OF A HELICOPTER

[76] Inventor: Paul H. Sanderson, 2019 Cripple Creek, Lewisville, Tex. 75067

[21] Appl. No.: 417,922

[22] Filed: Apr. 6, 1995

[51] Int. Cl.⁶ ............................. F41A 23/52; B64D 7/00
[52] U.S. Cl. ................................. 89/37.16; 244/118.1
[58] Field of Search .............................. 89/37.16, 37.22; 244/118.1, 119, 137.1, 137.3

[56] References Cited

U.S. PATENT DOCUMENTS

5,187,318  2/1993  Sanderson et al. ............... 89/37.22
5,253,574  10/1993  Sanderson ............................ 89/34

*Primary Examiner*—Stephen C. Bentley
*Attorney, Agent, or Firm*—Konneker & Bush

[57] ABSTRACT

A longitudinally central portion of a weaponry support plank is secured to the cabin area floor of a McDonnell Douglas 500/530 helicopter using a support and reinforcing system associated with forwardly and rearwardly disposed pairs of stiffening ribs anchored to the top side of the floor. Opposite end portions of the front and rear rib pairs are removed and are laterally enclosed in and anchored to elongated reinforcing structures each having opposite ends generally aligned with the opposite ends of its associated shortened rib. End members are anchored to the floor at the opposite ends of each pair of shortened ribs and are also anchored to the opposite ends of their associated reinforcing structure. Two front support strut members have upper sides fixedly secured in a spaced relationship to a front side edge of the central plank portion, and two rear support strut members have sides fixedly secured in a spaced relationship to the rear side edge of the central plank portion. The undersides of the support strut members are removably and pivotally secured to the end members by expansion pins extending along axes transverse to the stiffening ribs. In an alternate embodiment of the support and reinforcing system the front support strut members are provided with rearwardly projecting extension portions that are anchored to reinforced opposite end portions of the central floor stiffening rib.

24 Claims, 5 Drawing Sheets

APPARATUS AND METHODS FOR MOUNTING A WEAPONRY SUPPORT PLANK ON THE CABIN AREA FLOOR OF A HELICOPTER

BACKGROUND OF THE INVENTION

The present invention generally relates to aircraft armament apparatus and, in a preferred embodiment thereof, more particularly relates to apparatus and methods for operatively securing a weaponry support plank to the cabin area of a helicopter.

As representatively illustrated in U.S. Pat. No. 5,187,318 to Sanderson et al and U.S. Pat. No. 5,253,574 to Sanderson, an advantageous method of mounting weaponry, such as machine guns and rocket launchers, on a helicopter incorporates an elongated support plank member that is longitudinally extended transversely through the cabin area of the helicopter, with a central portion of the plank being anchored to the cabin area floor and outer end portions of the plank projecting outwardly beyond opposite sides of the helicopter. The selected weaponry is supported on the undersides of these outwardly projecting plank end portions.

As manufactured, the cabin area floor in the McDonnell Douglas 500/530 helicopter is strengthened by five forwardly disposed reinforcing ribs or "hats" riveted and spot welded to the top side of the floor. The ribs are in a mutually spaced, parallel array and longitudinally extend across the cabin area floor between opposite exterior sides of the helicopter. These ribs, while designed to strengthen the cabin area floor, are not strong enough under dynamic loading such as hang-fire loads, crash loads and gun recoil loads to support the weight of the plank and the weaponry secured to its outer ends, and must be reinforced to do so.

A previously used method of reinforcing the ribs, generally illustrated in the aforementioned U.S. Pat. Nos. 5,187,318 and 5,253,574, was to reinforce the forwardmost and rearwardmost rib by attaching relatively deep reinforcing beams to the opposite sides of each rib, parallel to their lengths, and securing transverse support members atop the opposite ends of the beams together with various auxiliary gussets and other bracing structures. The longitudinally intermediate plank portion was then mounted to top side portions of these transverse support members.

Three primary disadvantages were associated with this previously utilized plank-to-cabin floor securement technique. First, because of the height of the overall reinforcing structure, the cabin area floor became nearly unusable, even with the support plank removed. Second the relatively high weight (approximately 40 pounds) of the rib reinforcing structure and associated plank attachment apparatus was considered undesirable. Third, this previously utilized reinforcing structure tended to undesirably concentrate plank loading over a relatively small portion of the cabin area floor.

In view of the foregoing it can readily be seen that it would be desirable to provide improved apparatus and methods for operatively securing a longitudinally central weaponry support plank portion to a helicopter cabin area floor of the general type described above. It is accordingly an object of the present invention to provide such improved apparatus and methods.

SUMMARY OF THE INVENTION

In carrying out principles of the present invention, in accordance with a preferred embodiment thereof, a longitudinally central portion of a weaponry support plank is operatively secured to the cabin area floor of a helicopter, representatively a McDonnell Douglas 500/530 helicopter, using a specially designed plank support and floor reinforcing system.

As originally manufactured, the cabin area floor extends in a front-to-rear direction along a portion of the length of the helicopter and has opposite side edges adjacent cabin area door openings, and a mutually spaced series of five elongated, parallel stiffening ribs secured to the top side of the cabin area floor and longitudinally extending transversely to the front-to-rear direction between a pair of door sill extrusions at the opposite side edges of the floor.

To reinforce the cabin area floor, and ready it for securement thereto of the central weaponry support plank portion, the forwardmost and rearwardmost pairs of stiffening ribs are shortened by removing opposite end portions thereof. Additionally, longitudinal portions of the door sill extrusions that face the opposite ends of the shortened ribs are removed. The shortened ribs are reinforced using reinforcing structures anchored to and laterally enveloping the shortened ribs. Preferably, each reinforcing structure is formed in two overlapping lateral sections—a rail member and a rail cover member—and has opposite ends generally aligned with the opposite ends of its associated shortened stiffening rib. Preferably, two series of vertically elongated sheet metal skin doubling strips are provided and secured in horizontally spaced orientations on the opposite outer sides of the helicopter at the cabin area thereof. Top end portions of the strips are anchored to the outer sides of the end members.

Four end members are provided and positioned at the opposite ends of each shortened rib pair, generally in the area previously occupied by the removed rib end portions and facing sections of the door sill extrusions. Each end member is anchored to the cabin area floor and to the end portions of two of the reinforcing structures laterally enveloping two of the shortened stiffening ribs.

To mount the longitudinally central weaponry support plank portion on the now reinforced cabin area floor, four support strut members are provided. Upper sides of two of the support strut members are fixedly secured to a front side edge of the central plank portion in a longitudinally spaced relationship thereon, and upper sides of the other two of the support strut members are fixedly secured to a the rear side edge of the central plank portion in a longitudinally spaced relationship thereon. The lower sides of the support strut members are then removably and pivotally secured to the end members using expansion pins longitudinally extending along axes generally transverse to the stiffening ribs.

In an alternate embodiment of the floor reinforcing system metal hat reinforcing members are secured to opposite end portions of the central floor reinforcing rib, and the front pair of support strut members are modified to provide rearward extensions thereof that are secured to the hat reinforcing members. In this embodiment of the floor reinforcing system a weaponry support plank mounted thereon is tied to all five floor reinforcing ribs.

DETAILED DESCRIPTION

Figure 1:
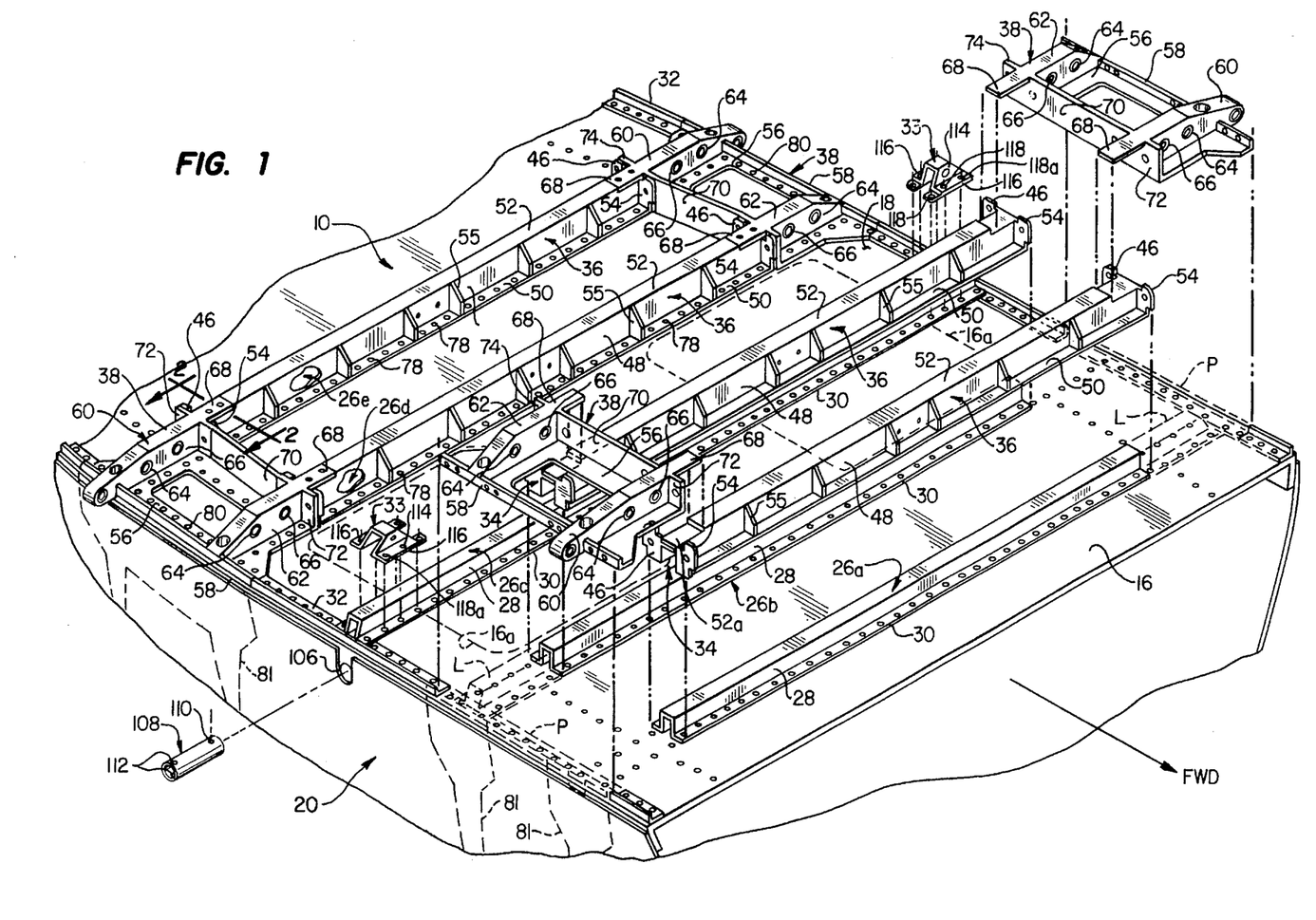
FIG. 1 is a partially exploded perspective view of a specially designed reinforcing rail structure embodying principles of the present invention and used to operatively secure a longitudinally central portion of a weaponry support plank to the cabin area floor structure of a helicopter.
Figure 5:
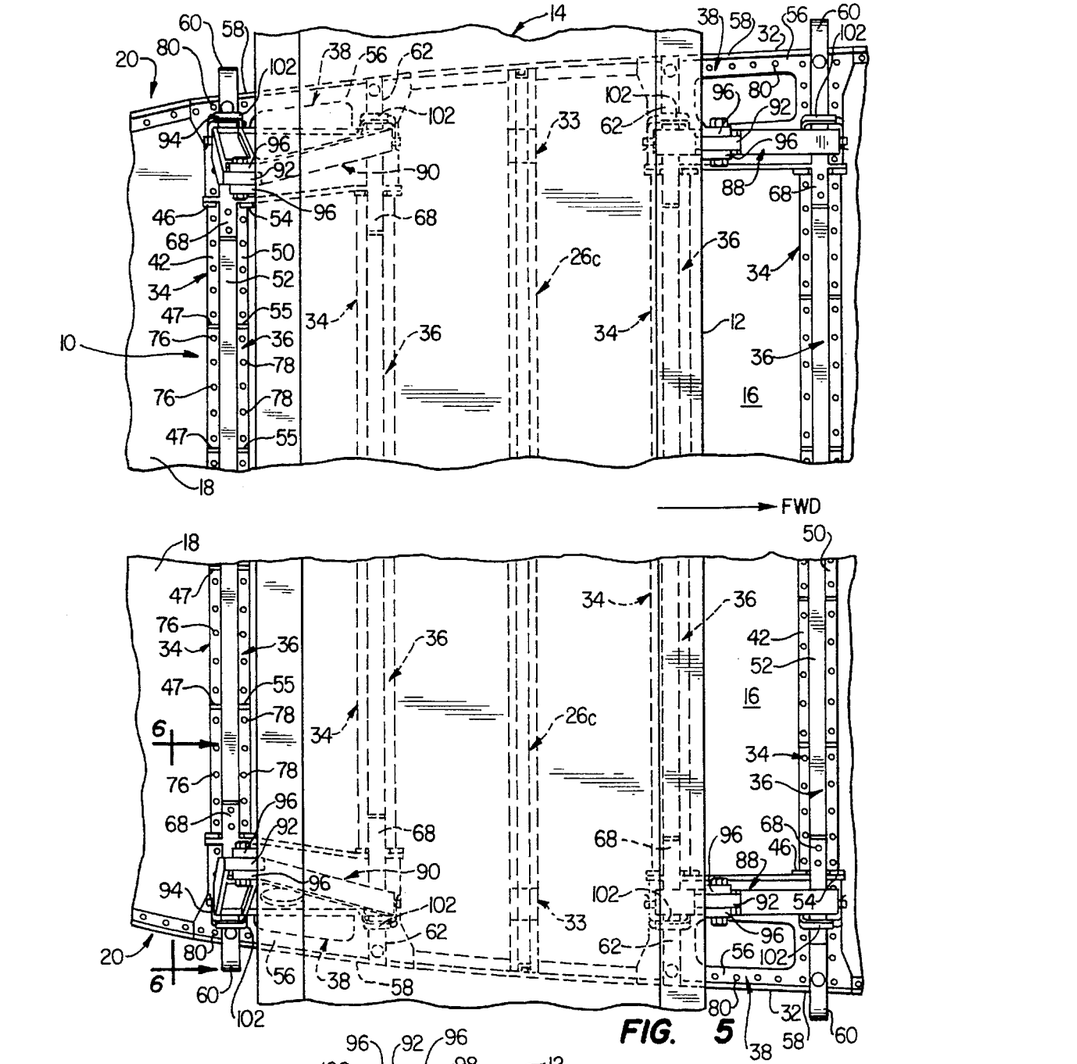
FIG. 5 is a longitudinally foreshortened top plan view of the reinforcing rail structure illustrating a longitudinally central portion of a weaponry support plank operatively supported thereon.
Figure 7:
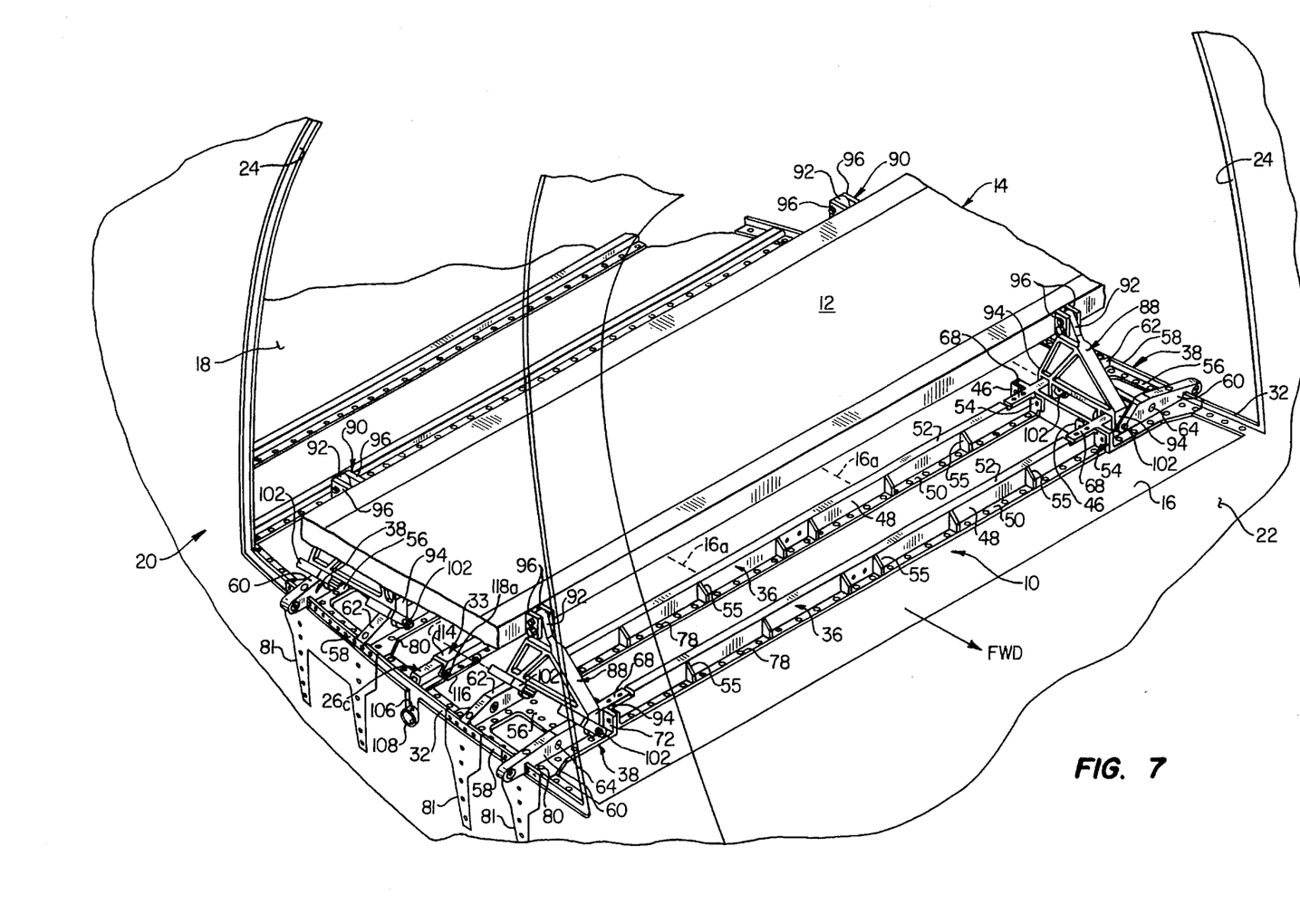
FIG. 7 is a perspective view of the reinforcing rail structure showing a longitudinally central portion of a weaponry support plank operatively mounted thereon.

Referring initially to FIGS. 1, 5 and 7, the present invention provides a specially designed retrofit reinforcing rail system 10 used to operatively secure a longitudinally central portion 12 of a weaponry support plank 14 to the floor 16 in the cabin area 18 of a helicopter 20. Representatively, the helicopter 20 is a McDonnell Douglas 500/530 helicopter. The cabin area 18 is immediately behind the cockpit area 22 of the helicopter and has door openings 24 on its opposite sides.

The support plank 14 is similar to those illustrated and described in U.S. Pat. Nos. 5,187,318 and 5,253,574 and longitudinally extends transversely through the cabin area 18, above the floor 16. Outer end portions of the support plank 14 (not illustrated) project outwardly beyond the opposite sides of the helicopter 20 and support various types of weaponry, such as rocket launchers and machine guns, on their undersides.

In the as-manufactured helicopter 20, the cabin area floor 16 is strengthened using five elongated hollow reinforcing rib or "hat" structures 26a–26e as best illustrated in FIG. 1. Each rib 26 has, along its length, a generally inverted U-shaped body section 28 from the bottom sides of which a pair of mounting flanges 30 project outwardly in opposite lateral directions, the flanges 30 being riveted and spot welded along their lengths to the cabin area floor 16. The ribs 26 are in a laterally spaced, mutually parallel array and longitudinally extend transversely between a pair of metal door sill extrusions 32 extending along the door sides of the cabin area floor 16.

Although the originally installed ribs 26a–26e serve to reinforce the cabin area floor 16, they are not strong enough during the previously mentioned dynamic loading conditions to support the plank 14 and the weaponry mounted on its outer end portions that project outwardly beyond the opposite sides of the helicopter 20. Accordingly, the plank 14 cannot be secured directly to ribs 26—a supplemental plank mounting system is required. Prior to the present invention, this supplemental mounting system (generally illustrated in the aforementioned U.S. Pat. Nos. 5,187,318 and 5,253,574) comprised relatively deep (about 4") reinforcing beams extending parallel to and attached to the opposite sides of the front and rear ribs 26a and 26e. Each of the ribs 26 is approximately 0.875 inches high. Transverse support members were secured atop opposite ends of these reinforcing beams, and the plank was secured atop the transverse support members using various auxiliary gussets and other bracing structures, shown generally in the above-mentioned patents.

Three primary disadvantages were associated with this previously utilized rib reinforcing/plank mounting system. First, because of the relatively large height (about 4") of the overall reinforcing structure, the cabin area floor became nearly unusable, even with the support plank removed. Second, the previously used reinforcing structure, and the associated hardware used to secure the plank thereto, added a relatively high weight (over 40 pounds) to the helicopter. Third, the previously used reinforcing structure tended to undesirably concentrate plank loading on a relatively small portion of the cabin area floor.

The retrofitted reinforcing rail system 10 of the present invention, which will now be described with initial reference to FIG. 1, advantageously eliminates these problems. In preparation for the retrofit installation of the reinforcing rail system 10 longitudinal portions L (shown in phantom in FIG. 1) are removed from each end of the front two ribs 26a and 26b, and from each end of the rear two ribs 26d and 26e. With the exception of subsequently described hat bracket members 33 installed on its opposite ends, the middle rib 26c is left unmodified. Additionally, portions P of the door sill extrusions 32 at the opposite ends of the rib pairs 26a, 26b and 26d, 26e are cut away.

Figure 4:
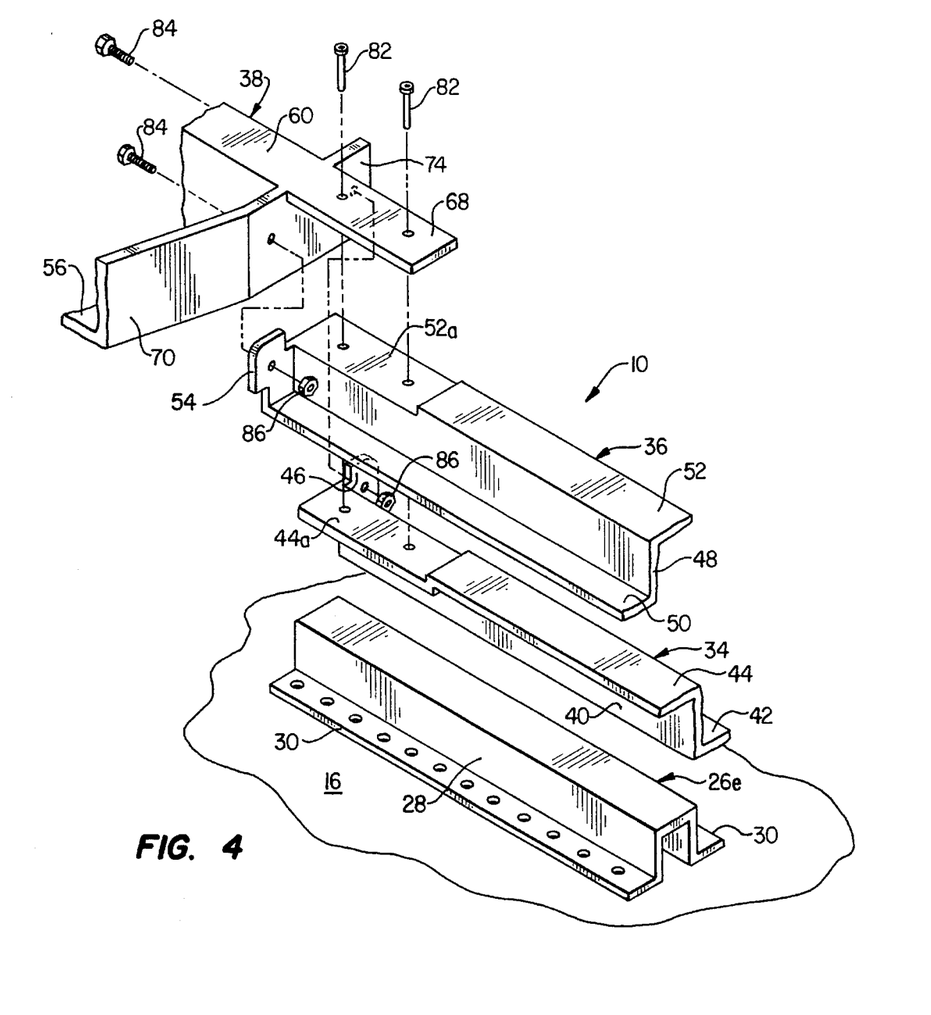
FIG. 4 is an enlarged scale exploded fragmentary perspective view of an end portion of the reinforcing rail structure.

With initial reference now to FIGS. 1 and 4, the reinforcing rail system 10 includes, at each of the longitudinally shortened ribs 26a, 26b, 26d and 26e, an elongated rail member 34 and an elongated rail cover member 36. System 10 also includes four end block members 38 which, like the rail members 34 and rail cover members 36, are formed from a high strength aluminum material.

Each rail member 34 has, along its length, a vertically oriented central wall 40, a transverse base wall 42 laterally extending in one direction from the bottom edge of the central wall 40, and a transverse top wall 44 laterally extending in the opposite direction from the top edge of the central wall 40. The top wall 44 has downwardly offset opposite end portions 44a, and integrally formed mounting tabs 46 disposed at the opposite ends of the rail member 34 and extending along its base and central walls 42 and 44. Walls 40, 42 are reinforced by a longitudinally spaced series of stiffening webs 47 (see FIG. 5) extending therebetween.

Each rail cover member 36 has, along its length, a vertically oriented central wall 48, a transverse base wall 50 laterally extending in one direction from the bottom edge of the central wall 48, and a transverse top wall 52 laterally extending in the opposite direction from the top edge of the central wall 48. The top wall 52 has downwardly offset opposite end portions 52a, and integrally formed mounting tabs 54 disposed at the opposite ends of the rail cover member 36 and extending along its base and central walls 50 and 52. Walls 48, 50 are reinforced by a longitudinally spaced series of stiffening webs 55 (see FIGS. 1, 5 and 7) extending therebetween.

Referring now to FIGS. 1, 4, 5 and 6, each of the four end block members 38 has an apertured base plate portion 56 with an upturned outer side edge portion 58. Projecting upwardly from the top side of the base plate portion 56 are spaced apart first and second elongated mounting lugs 60 and 62 each having mounting holes 64, 66 formed therein. A pair of alignment tabs 68 project inwardly from the top sides of the inner ends of the mounting lugs 60 and 62. The mounting lugs 60 and 62 are connected at inner end portions thereof by a joining plate portion 70 having opposite front and rear end portions 72 and 74.

Figure 2:
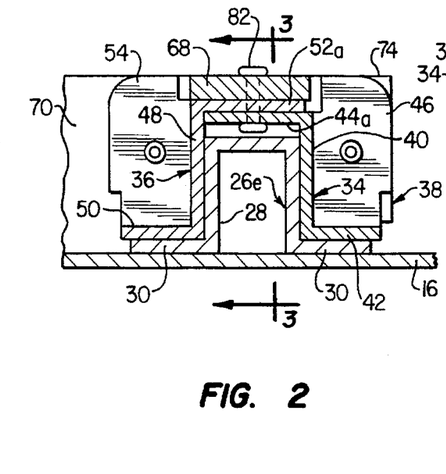
FIG. 2 is an enlarged scale partial cross-sectional view through a portion of the reinforcing rail structure taken along line 2—2 of FIG. 1.
Figure 3:
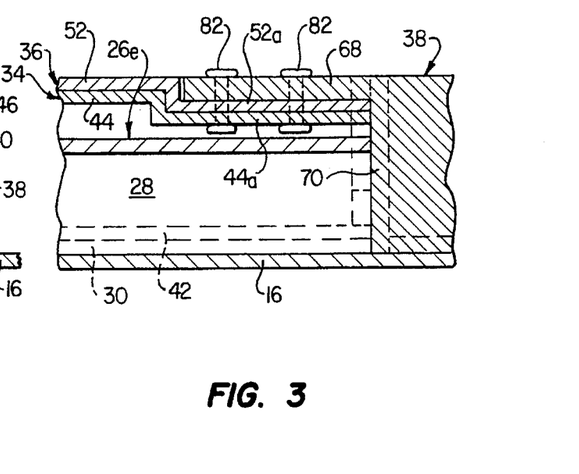
FIG. 3 is a cross-sectional view taken along line 3—3 through the reinforcing rail structure portion shown in FIG. 2.

After the end portions L are removed from the existing ribs 26a, 26b, 26d and 26e (see FIG. 1), and the portions P are removed from the door sill extrusions 32, the reinforcing rail system 10 is operatively installed in the following manner. Referring now to FIGS. 1–5, the four rail members 34 are positioned over, and in longitudinal alignment with, the shortened ribs 26a, 26b, 26d and 26e, with the central walls 40 of the rail members 34 abutting vertical side portions of the rib bodies 28 (see FIG. 2) and the base walls 42 of the rail members 34 downwardly engaging one of the mounting flanges 30 of each of the shortened ribs. The rail members 34 are then anchored in place using rivets 76. As best illustrated in FIG. 2, the downwardly offset top wall portions 44a of the installed rail members 34 are spaced slightly upwardly apart from the top sides of the rib bodies 28.

Next, the four rail cover members 36 are placed over the installed rail members 34 in a manner such that the downwardly offset top wall portions 52a of the rail cover members enter the rail member end depressions formed by the downwardly offset top wall portions 44a thereof, the central walls 48 of the rail cover members 36 abut vertical sides of the rib bodies 28, and the base walls 50 of the rail cover members 36 downwardly engage the underlying base walls 30 of the rail members 34 as best illustrated in FIG. 2. The base walls 50 of the rail cover members 36 are then anchored in place using rivets 78 (see FIG. 5). The nesting interfit between the downwardly offset top wall end portions 44a of the rail members 34 and the downwardly offset top wall end portions 52a of the rail cover members 34 serves to longitudinally align the mounting tab portions 46, 54 of the associated pairs of rail members 34 and rail cover members 36 as may be best seen in FIG. 1.

It should be noted that the spacing of the top walls 44 of the rail members 34 slightly above the top sides of their associated rib bodies 28 compensates for height variations in the ribs 26a, 26b, 26d and 26e. Additionally, the sliding overlapping of the top walls 44, 52 of the rail and rail cover members 34, 36 advantageously allows for horizontal width variations in the ribs 26a, 26b, 26d and 26e.

After the rail cover members 36 have been riveted into place against their associated rail members 34, the four end block members 38 are installed at the opposite ends of the now reinforced rib pairs 26a, 26b and 26d, 26e as illustrated in FIG. 1. More specifically, the base plate portions 56 of end block members 38 are placed against the cabin area floor 16 in the areas thereof previously occupies by the removed portions P and L of the door sill extrusions 32 and the ribs 26a, 26b, 26d and 26e, with the tab portions 68 of the end block members 38 being downwardly engaged with the downwardly offset portions 52a of the top walls 52 of the rail cover members 36, and the upturned side edge portions 58 of the end block base plates 56 being received in the door sill extrusion notches formed by the removal of the sections P thereof.

This placement of the end blocks 38 positions the joining plate end portions 72, 74 of each end block respectively against the tabs 54, 46 of a rail member/rail cover member pair as best illustrated in FIG. 1. The base plate portions 56 of the end blocks 38 are then anchored to the cabin area floor 16 by rivets 80 (and/or screws, bolts and blind bolts), the end block member tabs 68 are anchored to the rail and rail cover member walls 44a,52a using rivets or blind bolts 82 (see FIGS. 2–4), and the joining plate end portions 72, 74 of the end blocks 38 are anchored to the rail and rail cover member tabs 46, 54 using bolts 84 and nuts 86 (see FIG. 4). Additionally, as best illustrated in FIGS. 1 and 7, to reinforce the opposite exterior side walls of the helicopter 20 along the cabin area thereof sheet metal skin doubler members 81 are riveted to the exterior sides of the helicopter and have upper ends riveted to the upturned side edge portions 58 of the base plates 56 of the end block members 38. This completes the reinforcement of the cabin area floor 16 in preparation for the operative securement of the longitudinally central portion 12 of the weaponry support plank 14 thereto.

As best illustrated in FIGS. 1, 5 and 7, outer end portions of the mounting lugs 60 project outwardly beyond the opposite side walls of the helicopter 20. These outwardly projecting portions of the mounting lugs 60 may conveniently serve as tie-down projections for tying the helicopter down to a pad or pallet, or for other purposes such as to provide connection points for rappelling operations.

Figure 6:
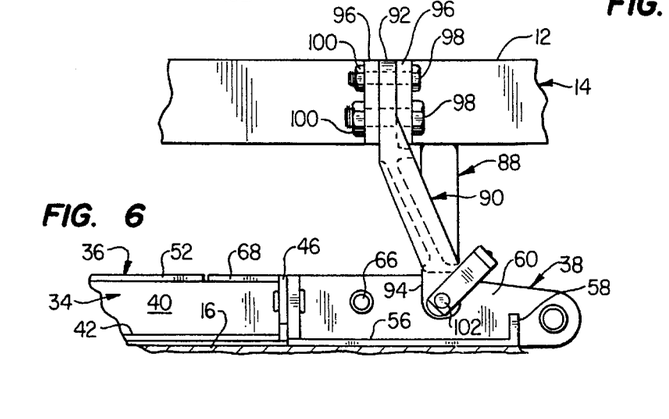
FIG. 6 is an enlarged scale side elevational view of an end portion of the reinforcing rail structure taken generally along line 6—6 of FIG. 5.

Referring now to FIGS. 5–7, the longitudinally central portion 12 of the weaponry support plank 14 is removably anchored to the installed end block members 38 by two forward attachment strut members 88 and two aft attachment strut members 90. Each of the strut members 88, 90 is formed from a high strength aluminum material, and is generally trapezoidally shaped. Upwardly projecting attachment lugs 92 are formed on the relatively narrow top sides of the strut members 88 and 90, and attachment yokes 94 project downwardly from the opposite front and rear corners of the wider bottom sides of the strut members 88, 90.

The attachment lugs 92 are received between pairs of mounting tabs 96 formed on the opposite front and rear side edges of the central plank portion 12, and are fixedly anchored thereto by expansion bolts 98 and nuts 100 (see FIG. 6). As best illustrated in FIGS. 5–7, the attachment yokes 94 downwardly straddle the mounting lug portions 60, 62 and are removably secured thereto by conventional expansion pin structures 102 having cylindrical body portions extending through the attachment yokes 94 and their associated mounting lugs 60, 62. The expansion pins 102 associated with the forward support strut members 88 extend through the openings 66 in the mounting lug portions 60, 62 of the strut members 88, and the expansion pins 102 associated with the aft support strut members 90 extend through the openings 64 in the mounting lug portions 60, 62 of the strut members 90.

The use of the expansion pins 102 to removably secure the bottom sides of the strut members 88, 90 to the end block members 38 permits the support plank 14 to be easily and quickly secured to and removed from the reinforced floor rib structures, and permits a limited degree of pivotal movement of the installed strut members 88, 90 relative to the cabin area floor 16 about the axes of the expansion pins.

Although the front struts 88 as illustrated herein are connected, via the front end block members 38, only to the reinforced ribs 26a and 26b, they may be replaced with modified front struts which additionally attach to the central rib 26c to thereby accommodate heavier plank weaponry loads. In this modification, the aft ends of the front struts would be extended rearwardly and provided with suitable attachment means for additionally connecting the enlarged front struts to the central rib 26c.

The overall plank mounting and floor rib reinforcement structure of the present invention provides a variety of advantages over the previously proposed plank mounting apparatus generally described herein. For example, it provides for an easier and quicker installation and removal of the support plank. Additionally, compared to the previously proposed mounting apparatus which weighs approximately 40 pounds, the plank mounting and rib reinforcing system of the present invention weighs only about 17 pounds—a considerable weight savings.

Moreover, the overall plank and weaponry load is more evenly distributed over the cabin area floor since such loads are divided among four rib areas as opposed to only two rib areas in the previously proposed plank mounting system. Also, the pivotal mounting of the struts 88, 90 to the end blocks 38 advantageously tends to isolate, to a substantial degree, the reinforced rib structures from flexural loads imposed on the installed weaponry support plank 14.

An additional benefit of the overall plank mounting and rib reinforcement system of the present invention is that the reinforced rib structures are only about 1.250" high compared to the approximately 4.0" heights of the originally installed floor beams, and the struts 88, 90 are removed with the support plank 14. Thus, the usability of the cabin area floor 10 is substantially maintained after removal of the support plank.

Turning now to FIGS. 1, 5 and 7, adjacent each opposite side of the cabin area 18 the cabin floor 16 has a lift-out fuel cell access panel portion 16a positioned beneath an end portion of the reinforcing rib 26c which is suitably secured, with appropriate fastening members, to the top side of the panel portion 16a and removable from the balance of the rib 26c. Accordingly, when either panel portion 16a is lifted upwardly to provide access to the fuel cell below it, its associated end portion of the reinforcing rib 26c is also temporarily separated from the balance of the reinforcing rib 26c.

Formed in the opposite side walls of the helicopter 20, just below the opposite ends of the reinforcing rib 26c, are a pair of conventional, circularly cross-sectioned jack openings 106, only one of which is visible in the drawings. Each of these openings extends into the helicopter 20, below an end of the reinforcing rib 26c, and is configured to receive a similarly configured portion of a lifting jack structure used to selectively jack up a side of the helicopter. With the jack structures removed from the associated jack openings 106, two tubular metal attachment members 108 are inserted into the openings 106 in place of the removed jack structures. As best illustrated in FIG. 1, each attachment member has a sidewall screw opening 110 adjacent its inner end, and a diametrically opposite pair of side wall lanyard openings 112 adjacent its outer end.

Each of the previously mentioned metal hat bracket members 33 has a generally U-shaped body portion 114 configured to nestingly fit down over an end portion of the body section 28 of the reinforcing rib 26c, and a pair of opposite, horizontally projecting side flanges 116 positioned to overlie longitudinal segments of the rib 26c. As illustrated, each of the side flanges 116 has formed therein three holes 118 through which suitable threaded fasteners (not shown) may be downwardly extended and threaded into the underlying flange 30 and the cabin floor. At each of the hat bracket members 33 a fourth screw 120 (see FIG. 8) is downwardly extended through its flange opening 118a and threaded into the screw opening 110 in the underlying tubular attachment member 108, thereby providing the mounted hat bracket members 33 with additional support.

Figure 8:
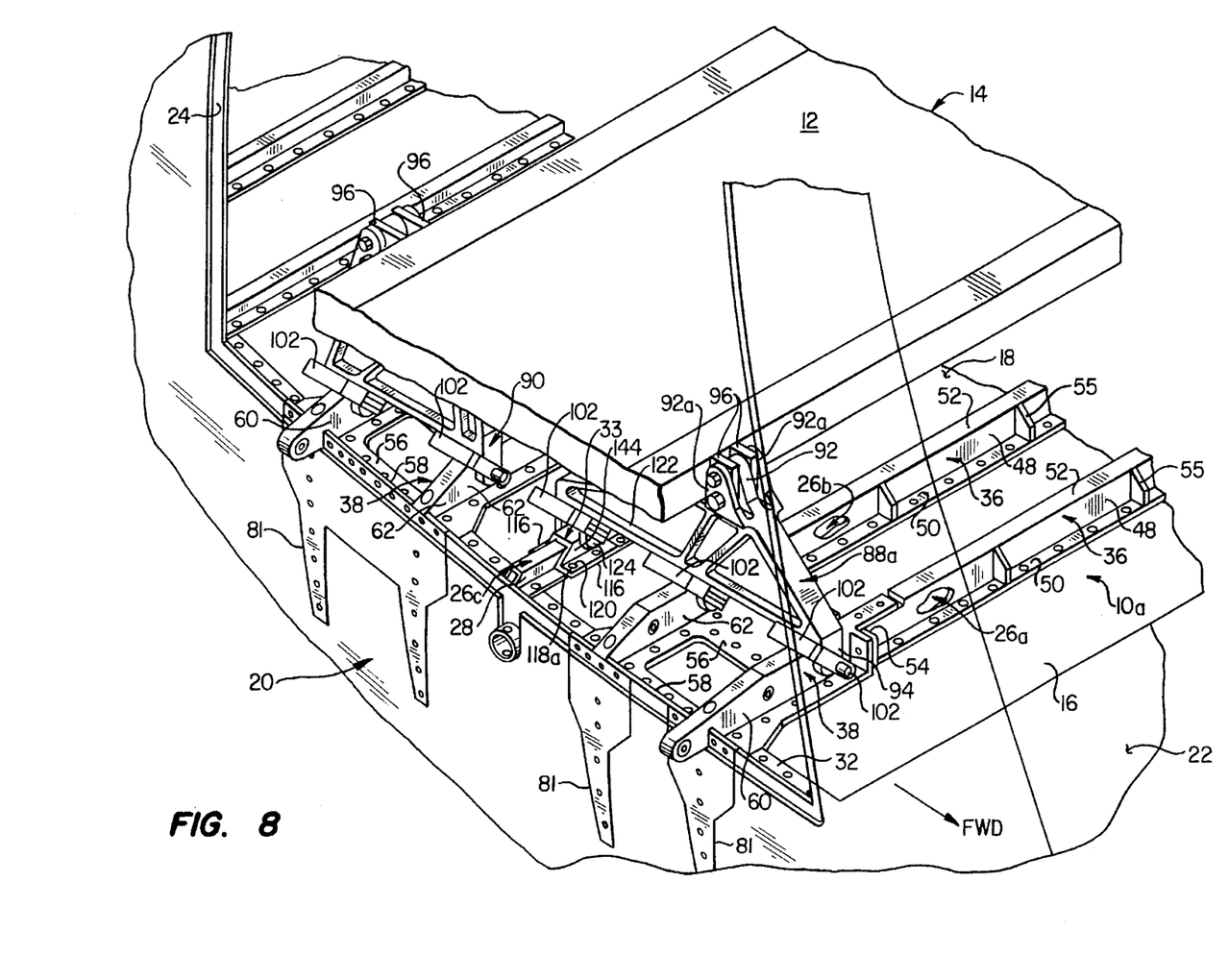
FIG. 8 is an enlarged scale perspective view of a portion of an alternate embodiment of the reinforcing rail structure with a longitudinally central portion of a weaponry support plank operatively mounted thereon.

In the alternate reinforcing rail system embodiment 10a shown in FIG. 8, the previously described front support strut members 88 are replaced with two modified front support strut members 88a, one on each side of the cabin area 18. Front support strut members 88a differ from the support strut members 88 in two ways. First, in addition to the attachment lug 92 disposed on the top side of each strut member 88a and positionable between a front side pair of the plank mounting lugs 96, each modified front strut member 88a is provided on its top side with a pair of auxiliary attachment lugs 92a that are positionable on the outer sides of the plank mounting lugs 96 as shown to strengthen this strut-to-plank connection.

Second, as illustrated in FIG. 8, each of the modified front support strut members 88a has a rearwardly extending extension portion 122 having a downwardly projecting attachment yoke 124 that straddles the body portion 114 of one of the metal hat bracket members 33 and is removably secured thereto by an expansion pin 102 extending through the yoke 124 and suitable openings formed through the body portion 114. Accordingly, each of the modified front support strut members is tied, via the reinforcing system 10a, to three of the floor ribs—namely the front two ribs 26a, 26b and the central rib 26c. The use of these modified front support strut members 88a provides the cabin floor with even higher gross weight support capability. If desired, the front support strut members 88 can alternatively have the triple attachment lug structure 92a, 92, 92a on their top sides, and the modified front support struct members 88a can alternatively have the single attachment lug structures 92 on their top sides if desired.

The foregoing detailed description is to be clearly understood as being given by way of illustration and example only, the spirit and scope of the present invention being limited solely by the appended claims.

What is claimed is:

1. Weaponry support apparatus for use in a helicopter having a cabin area floor extending in a front-to-rear direction along a portion of the length of the helicopter and having opposite side edges adjacent cabin area door openings, and a mutually spaced series of elongated, parallel stiffening ribs secured to the top side of the cabin area floor and longitudinally extending transversely to said front-to-rear direction, said series of stiffening ribs including front and rear pluralities thereof and an intermediate rib disposed between said front and rear pluralities thereof, said weaponry support apparatus comprising:

a series of reinforcing means, each individually extending over, being anchored to and covering the stiffening ribs in said front and rear pluralities thereof, for reinforcing the stiffening ribs in said front and rear pluralities thereof, each of said series of reinforcing means having opposite ends generally aligned with its associated stiffening rib;

first and second pairs of end members respectively positioned at the opposite ends of said front and rear pluralities of stiffening ribs, said first pair of end members being anchored to said cabin area floor and to the opposite ends of the reinforcing means associated with said front plurality of stiffening ribs, and said second pair of end members being anchored to said cabin area floor and to the opposite ends of the reinforcing means associated with said rear plurality of stiffening ribs;

a weaponry support plank having a longitudinally central portion extending transversely through said cabin area in an upwardly spaced relationship with said series of reinforcing means, said longitudinally central portion of said weaponry support plank having a forwardly facing first side edge and a rearwardly facing second side edge;

a spaced apart pair of front support strut members having top side portions fixedly anchored to said first side edge of said longitudinally central portion of said weaponry support plank, and bottom side portions removably secured to said first pair of end members for pivotal movement relative thereto about axes generally parallel to said front-to-rear direction; and a spaced apart pair of rear support strut members having top side portions fixedly anchored to said second side edge of said longitudinally central portion of said weaponry support plank, and bottom side portions removably secured to said second pair of end members for pivotal movement relative thereto about axes generally parallel to said front-to-rear direction.

2. The weaponry support apparatus of claim 1 wherein:

each of said stiffening ribs has, along its length, a hollow, generally inverted U-shaped body portion defined by first and second vertical side walls joined at upper side edges by a top side wall, and having a pair of flange portions projecting outwardly in opposite lateral directions from bottom side edges thereof, said flange portions being anchored to said cabin area floor, and the reinforcing means at each stiffening rib in said front and rear pluralities thereof include:

an elongated rail member having, along its length, a vertically oriented central wall outwardly abutting the first vertical side wall of the stiffening rib, a transverse base wall overlying and anchored to one of the flange portions of the stiffening rib, and a transverse top wall extending over the top side wall of the stiffening rib in a parallel, upwardly spaced relationship therewith, and an elongated rail cover member having, along its length, a vertically oriented central wall outwardly abutting the second vertical side wall of the stiffening rib, a transverse base wall overlying and anchored to the other one of the flange portions of the stiffening rib, and a transverse top wall overlying and abutting said transverse top wall of said rail member.

3. The weaponry support apparatus of claim 2 wherein:

said transverse top wall of said rail member has opposite end portions downwardly offset relative to the balance of said rail member, and said transverse top wall of said rail cover member has opposite end portions downwardly offset relative to the balance of said rail cover member and downwardly engaging the opposite end portions of said rail member.

4. The weaponry support apparatus of claim 3 wherein:

each of said end members has a spaced pair of alignment tab portions overlying a pair of downwardly offset end portions of the transverse top walls of said rail cover members and anchored thereto, and the underlying downwardly offset end portions of their associated rail members, by separate fastening members.

5. The weaponry support apparatus of claim 1 wherein:

said longitudinally central portion of said weaponry support plank has spaced first and second pairs of mounting tabs on each of said first and second side edges thereof, said front support strut members have mounting lugs projecting upwardly from top sides thereof and being received and fixedly anchored between said first pairs of mounting tabs, and said rear support strut members have mounting lugs projecting upwardly from top sides thereof and being received and fixedly anchored between said second pairs of mounting tabs.

6. The weaponry support apparatus of claim 5 wherein:

each of said end members has a spaced pair of mounting lugs thereon, and each of said front and rear support strut members has a spaced pair of attachment yokes projecting downwardly from a bottom side thereof, each of said attachment yokes downwardly straddling one of said end member mounting lugs and being pivotally secured thereto by an expansion pin member.

7. The weaponry support apparatus of claim 1 wherein:

each of said reinforcing means, said first and second pairs of end members, and said front and rear support strut members are formed from a high strength aluminum material.

8. The weaponry support apparatus of claim 1 wherein:

said helicopter is a McDonnell Douglas 500/530 helicopter, and said cabin area floor has five of said stiffening ribs, said front plurality of stiffening ribs are the forwardmost pair of said five stiffening ribs, and said rear plurality of said five stiffening ribs are the rearwardmost pair of said five stiffening ribs.

9. The weaponry support apparatus of claim 1 further comprising:

a horizontally spaced plurality of vertically elongated sheet metal skin doubling members secured to opposite exterior side portions of the helicopter, at said cabin area thereof, and having top side portions secured to said first and second pairs of end members.

10. The weaponry support apparatus of claim 1 wherein:

said weaponry support apparatus further comprises end means secured to and reinforcing opposite end portions of said intermediate stiffening rib, and said pair of front support strut members have rearwardly projecting extension portions removably anchored to said end means.

11. The weaponry support apparatus of claim 10 wherein:

said end means include a pair of metal hat reinforcing members disposed in downwardly nested relationships with said opposite end portions of said intermediate stiffening rib.

12. The weaponry support apparatus of claim 11 wherein:

the helicopter has opposite side portions with jack openings extending horizontally inwardly therethrough generally beneath said opposite end portions of said intermediate stiffening rib, and said weaponry support apparatus further comprises tubular attachment members received in said jack openings and means for securing said hat reinforcing members to said tubular attachment members.

13. A method of mounting a weaponry support plank on a helicopter having a cabin area floor extending in a front-to-rear direction along a portion of the length of the helicopter and having opposite first and second side edges adjacent cabin area door openings, and a mutually spaced series of elongated parallel stiffening ribs, each secured to the top side of the cabin area floor and longitudinally extending transversely to said front-to-rear direction from adjacent said first and second side edges of the cabin area floor, said stiffening ribs including front and rear pluralities thereof and an intermediate stiffening rib disposed between said front and rear pluralities thereof, said method comprising the steps of:

shortening each of said stiffening ribs in said front and rear pluralities thereof by removing opposite end portions therefrom;

reinforcing the shortened stiffening ribs by laterally enclosing each of them with a separate reinforcing structure anchored thereto and having opposite ends generally aligned with the opposite ends of the shortened stiffening rib;

anchoring four end members to said cabin area floor, at the opposite ends of each front and rear pair of reinforcing structures, and fixedly securing each end member to the adjacent ends of its associated pair of reinforcing structures;

providing four support strut members, each having top and bottom sides;

fixedly securing the top sides of two of said support strut members in a spaced apart relationship to a first side edge of a longitudinally central portion of the weaponry support plank;

fixedly securing the top sides of the other two of said support strut members in a spaced apart relationship to the second side edge of the longitudinally central portion of the weaponry support plank;

orienting said longitudinally central portion of the weaponry support plank in a manner such that it longitudinally extends parallel to said stiffening ribs; and     removably securing said support strut members to said end members for pivotal movement relative thereto about axes generally transverse to said stiffening ribs.

14. The method of claim 13 wherein:

each of said stiffening ribs has, along its length, a hollow, generally inverted U-shaped body portion defined by first and second vertical side walls joined at upper side edges by a top side wall, and having a pair of flange portions projecting outwardly in opposite lateral directions from bottom side edges there, said flange portions being anchored to said cabin area floor, and said reinforcing step is performed by the steps of:

providing a series of elongated rail members each having, along its length, a vertically oriented central wall, and transverse base and top walls extending in opposite lateral directions from opposite side edges of the central wall,     providing a series of elongated rail cover members each having, along its length, a vertically oriented central wall, and transverse base and top walls extending in opposite lateral directions from opposite side edges of the central wall,     anchoring said rail members to the shortened stiffening ribs in a manner such that the central wall of each rail member abuts the first vertical side wall of its associated rib, the top wall of the rail member upwardly overlies the top wall of its associated rib, and the base wall of the rail member downwardly engages one of the flanges of its associated rib, and     anchoring said rail cover members to the shortened stiffening ribs in a manner such that the central wall of each rail cover member abuts the second vertical side wall of its associated rib, the top wall of the rail cover member downwardly engages the top wall of its associated rail member, and the base wall of the rail cover member downwardly engages the other one of the flanges of its associated rib.

15. The method of claim 14 wherein:

said transverse top wall of each rail member has opposite end portions downwardly offset relative to the balance of the rail member, said transverse top wall of each rail cover member has opposite end portions downwardly offset relative to the balance of the rail cover member, and said step of anchoring said rail cover members includes the step of complimentarily engaging the downwardly offset opposite end portions of each rail cover member with the downwardly offset opposite end portions of its associated rail member.

16. The method of claim 15 wherein:

each of said end members has a spaced pair of alignment tab portions, and said step of fixedly securing each end member to the adjacent ends of its associated pair of reinforcing structures includes the steps of positioning said alignment tab portions over, and riveting them to, adjacent pairs of downwardly offset rail cover member top wall portions.

17. The method of claim 13 wherein said steps of fixedly securing the top sides of said support strut members to said longitudinally central weaponry support plank are performed by:

securing spaced first and second pairs of mounting tabs on each of said first and second side edges of said longitudinally central portion of said weaponry support plank,     forming mounting lugs on the top sides of said support strut members, and     fixedly securing each mounting lug between one of said first and second pairs of mounting tabs on said longitudinally central portion of said weaponry support plank.

18. The method of claim 17 wherein said removably securing step is performed by:

forming a spaced pair of upwardly projecting mounting lugs on each of said end members,     forming a spaced pair downwardly projecting attachment yokes on each of said support strut members, and     pivotally securing each of said end member mounting lugs within one of said attachment yokes.

19. The method of claim 18 wherein said step of pivotally securing each of said end member mounting lugs within one of said attachment yokes is performed using expansion pins.

20. The method of claim 13 wherein:

said helicopter is a McDonnell Douglas 500/530 helicopter, said cabin area floor has five of said stiffening ribs, and said shortening step is performed on the forwardmost pair and rearwardmost pair of said five stiffening ribs.

21. The method of claim 13 wherein:

said helicopter has a pair of elongated, upwardly projecting door sill extrusions longitudinally extending along said first and second side edges of said cabin area floor, said method further comprises the step of removing longitudinal portions of said door sill extrusions at the opposite ends of the front and rear pluralities of stiffening ribs, said end members have outer side edge portions on which upturned flanges are formed, and said step of anchoring four end members includes the step of positioning said upturned flanges in the door sill extrusion gaps formed by said step of removing longitudinal portions of said door sill extrusions.

22. The method of claim 13 further comprising the steps of:

providing a series of vertically elongated sheet metal skin doubling strips, securing said skin doubling strips in horizontally spaced arrays on the opposite exterior sides of the helicopter adjacent the first and second side edges of the cabin area floor, and fastening upper ends of said skin doubling strips to said end members.

23. The method of claim 13 wherein:

said two of said support strut members are disposed forwardly of said other two of said support strut members, and said method further comprises the steps of:

securing end reinforcing members to opposite end portions of said intermediate stiffening rib, and securing said two support strut members to said end reinforcing members.

24. The method of claim 23 wherein:

the helicopter has opposite side portions with jack openings extending horizontally inwardly therethrough generally beneath said opposite end portions of said intermediate stiffening rib, and said method further comprises the steps of:

inserting tubular attachment members into said jack openings, and securing said end reinforcing members to the inserted tubular attachment members.

* * * * *